UNITED STATES PATENT OFFICE.

LOUIS SPENCER LEVY, OF NEW YORK, N. Y.

POISON-DETERRENT.

1,204,794.   Specification of Letters Patent.   Patented Nov. 14, 1916.

No Drawing.   Application filed July 19, 1916.   Serial No. 110,071.

*To all whom it may concern:*

Be it known that I, LOUIS SPENCER LEVY, a citizen of the United States, and a resident of the borough of Manhattan, city, county, and State of New York, have invented certain new and useful Improvements in Poison-Deterrents, of which the following is a specification.

My invention relates to a combination of materials to minimize the danger of erroneously taking poisonous materials into the human system, and refers particularly to a combination which will act as a deterrent and warn a person of the poisonous qualities of a medicine, or mixture, through the senses of taste or smell.

Numerous antiseptic, disinfectant and other active medicinal materials necessary for the proper treatment of diseases are extremely poisonous in their properties when taken internally, and great danger is always experienced in their being taken erroneously, either through their close resemblance in appearance to harmless drugs, without proper observance of their appearance, or by children. Numerous attempts have been made to obviate or lessen this danger, but as they depend principally upon the sense of sight and feeling they have not proven effective, especially as a warning to children. I have invented a method whereby all of these difficulties in the production of a proper warning may be overcome, and whereby the accidental taking of such dangerous remedies may be prevented. I have found that these poisonous materials, or materials intended only for external use, may be safeguarded against their accidental introduction into the human system when combined with certain materials which on account of their peculiar, pungent or irritating odor or taste, will reduce to a minimum the possibility of their being swallowed, for it is evident that if the odor or immediate taste of the mixture be disagreeable, irritating and repugnant, even a child will refuse to swallow it. I have found among the materials suitable as a deterrent for this purpose such volatile substances as oil of mustard, oil of pepper, oil of horseradish, oleo-resin arisæma triphyllum, arisæma triphyllum extractive, oleo-resin anacardium occidentale, anacardium occidentale extractive, oleo-resin capsicum, fluid extract capsicum, ground mustard, ground capsicum, aloin and other derivatives of aloes, although I do not limit myself to these particular ingredients, as it is evident they may be varied and changed; the object of my invention being a combination of a poisonous material, or a material intended only for external use, with a material which will be repugnant to the sense of odor or taste and thus act as a deterrent to warn the intelligent of the dangerous properties of the mixture, and cause the unintelligent to reject the mixture with repugnance instead of swallowing it.

As one example of my invention I give the following: I use from 0.5% to 1.25% of a mixture of capsicum extractives, consisting of one part oleo-resin capsicum and two parts of artificial oil of mustard, with the ingredients ordinarily used in the production of bichlorid of mercury tablets, such as bichlorid of mercury mixed with sodium chlorid, ammonium chlorid, &c., and then convert the mixture into tablet form by any satisfactory means. The deterrent ingredients thus incorporated act as a preventive of the wrongful use of the tablet on account of their exceedingly irritating taste and odor, but do not interfere with the ordinary use of the tablet when it is dissolved in the proportions necessary for its medicinal application.

I do not limit myself to the particular ingredients nor to the particular quantities mentioned and described herein, as all of these may be varied without going beyond the scope of my invention as described and claimed.

What is claimed, is:

1. A tablet comprising a poisonous material combined with a volatile guard irritant acting so quickly upon the sense of taste or smell as to prevent ingestion of the tablet without warning.

2. A tablet comprising bichlorid of mercury combined with a volatile guard irritant acting so quickly upon the sense of taste or smell as to prevent ingestion of the tablet without warning.

3. A tablet comprising bichlorid of mercury combined with capsicum extractives and artificial essential oil of mustard in such proportions as to prevent ingestion of the tablet without warning.

Signed at New York city in the county of New York and State of New York, this 18th day of July 1916.

LOUIS SPENCER LEVY.

Witnesses:
NITA LYNCH,
TERESA V. LYNCH.